(12) United States Patent
Mandel et al.

(10) Patent No.: US 8,947,215 B2
(45) Date of Patent: Feb. 3, 2015

(54) SYSTEMS AND METHODS FOR IMPLEMENTING AUTOMATED WORKSTATION ELEVATION POSITION TRACKING AND CONTROL

(71) Applicant: XEROX Corporation, Norwalk, CT (US)

(72) Inventors: Barry P Mandel, Fairport, NY (US); Michael R Furst, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 175 days.

(21) Appl. No.: 13/679,984

(22) Filed: Nov. 16, 2012

(65) Prior Publication Data
US 2014/0137773 A1    May 22, 2014

(51) Int. Cl.
*G08B 1/00*    (2006.01)
(52) U.S. Cl.
USPC ................... 340/309.16; 340/309.7; 340/457; 108/20; 108/50.11; 108/147; 248/188.4; 248/188.5
(58) Field of Classification Search
USPC ................. 340/457, 573.1, 593, 669, 309.16, 340/309.7; 108/20, 50.11, 144.11, 147; 248/188.2, 188.5, 188.1, 188.4
See application file for complete search history.

(56) References Cited

U.S. PATENT DOCUMENTS

| | | | |
|---|---|---|---|
| 5,323,695 A * | 6/1994 | Borgman et al. | 108/147 |
| 5,884,882 A * | 3/1999 | Nada et al. | 248/188.2 |
| 6,062,148 A * | 5/2000 | Hodge et al. | 108/147 |
| 6,546,880 B2 * | 4/2003 | Agee | 108/147 |
| 6,595,144 B1 * | 7/2003 | Doyle | 108/147 |
| 7,077,068 B1 * | 7/2006 | Agee | 108/147 |
| 7,517,029 B2 * | 4/2009 | Cvek | 312/196 |
| 7,789,025 B2 * | 9/2010 | Michaud et al. | 108/60 |
| 2010/0198374 A1 * | 8/2010 | Carson et al. | 700/90 |

* cited by examiner

*Primary Examiner* — Hung T. Nguyen
(74) *Attorney, Agent, or Firm* — Ronald E. Prass, Jr.; Prass LLP (57) ABSTRACT

A system and method are provided for implementing an automated workstation elevation position tracking and control scheme. Software running on the user's computer generates reminders and/or to forces an individual to periodically readjust the height of the workstation in a manner that promotes standing while at work. A current position, and an elapsed time that the workstation has been at the current position, is detected with an objective of providing pre-programmed routine or random automated reminders to a user to change the current position of the workstation from one elevation state to the other. The software tracks the percent of time that a user is standing and optionally compares this with a pre-defined goal. Automatic control via the user workstation, of workstation elevator actuators is provided in a manner that makes it easier, or otherwise unavoidable, for the user to initiate repositioning from a sitting to a standing position.

30 Claims, 9 Drawing Sheets

SYSTEMS AND METHODS FOR IMPLEMENTING AUTOMATED WORKSTATION ELEVATION POSITION TRACKING AND CONTROL

BACKGROUND

1. Field of the Disclosed Embodiments

This disclosure relates to systems and methods for implementing an automated workstation elevation position tracking and control scheme.

2. Related Art

Increasing numbers of workers, including knowledge workers, are involved in jobs that include long periods sitting at office workstations. Modern technology has relegated many tasks to information exchange via the office workstations resulting in many workers being increasingly glued to their desks, not even needing to walk down the hall or across the room to effectively interact with colleagues. The productivity advantages that this modern work paradigm engenders introduce certain difficulties for the individual workers who tend to be much more sedentary in their working environments than in previous generations.

Doctors have become increasingly aware of the harmful health effects on individuals that result from prolonged sitting. Doctors have concluded that prolonged sitting may be extremely harmful to the body, and that in addition to leading to fatal heart disease, other wide ranging (often harmful) physiological effects may include: obesity (often leading to heart problems), poor posture (leading to back problems), eye strain (including itchy, burning, or watery eyes, or the like), poor blood circulation (leading, for example, to blood pooling, which can, in turn, lead to formation of varicose veins), and weakening of muscles (based on non-use of certain large muscle groups during long periods of muscle immobility).

Efforts to combat these negative physiological effects are not difficult to implement when consciously considered and acted upon. For example, the concept of active seating has emerged as a technique by which to address certain of the detrimental physiological effects of prolonged sitting. Active sitting occurs when, for example, a physical configuration of a chair encourages some amount of periodic or routine movement by the occupant. A broadening class of seating products is being made available that, at a minimum, may allow, or even promote, movement by being configured to provide one or more degrees of freedom that may tend to encourage movement by the occupant in a manner that at least modifies the occupant's posture while seated and enhances functional movement, which may mediate some of the ill effects of prolonged static sitting.

While such movements while seated may be beneficial, they may not be enough to effectively counteract at least some of the above-mentioned physiological effects in any meaningful way over time, particularly with regard to blood pooling and the related health effects. A better solution to combat the physiological difficulties caused by prolonged sitting may be to take frequent breaks during which, at a minimum, a seated occupant stands up simply to get the blood flowing to the lower extremities and otherwise throughout the individual's body. Where possible, seated workers should be encouraged to climb stairs or to simply walk around in their workspace at routine intervals for short respite periods. In short, it is generally acknowledged that, in an effort to combat the harmful effects of prolonged sitting at work, individual workers should make it a point to at least stand up at regular intervals and to take a walk when time and opportunity permit.

Research has shown that people who stand at work tend to be healthier than those who sit. Periods of standing throughout the day can improve circulation, muscle tone and vitality combating the health issues discussed above and others. Getting out of one's chair may not only offer psychological benefit, but may lead to increased productivity as well. Standing while working, even and perhaps particularly at a computer workstation, may aid in improving concentration by increasing blood flow to the brain. Individuals routinely report that standing seems to improve their clarity of thinking and their ability to focus. See, e.g., articles on this topic in the New York Times dated Apr. 21 and 23, 2010. An article published by Readers Digest entitled "Stand and Deliver: The Benefits of Standing at Your Desk" noted the ill effects of what has been dubbed the "Sitting Disease." The article catalogued these ill effects and promoted the use of standing desks as a measure by which to counter certain of these effects.

This is not to say that standing for an entire workday will not carry with it other difficulties. A balance should be struck between working while seated and standing regularly.

SUMMARY OF DISCLOSED EMBODIMENTS

There are workstation tables available on the market that allow the user to raise and lower the workstation table automatically using motor driven devices actuated with easy to use elevation control buttons. There are also smaller tabletop mounted systems that provide the ability to raise and lower a computer workstation and are, for example, counterbalanced so that the user can raise and lower the user's workstation in a reasonably simple manual process. Conventionally, each of these types of variable elevation systems requires that the user make an effort to remember, and to actually execute whatever process is required, to raise and lower the table at intervals. Oftentimes, while the users may initially have good intentions, even potentially diligent users may find, particularly when routinely engrossed in detailed and lengthy tasks, that they are not making the available adjustments in elevation of the worktable and/or workstation routinely enough to gain the benefits from standing as frequently as they had originally planned.

Given the conditions discussed above: (1) that many current workers spend significant amounts of time seated at a desk or workstation for prolonged periods; (2) that the need for improved health and relief from back pain is known to be high; (3) that simply standing for some, perhaps extended, period of time will produce health benefits; and (4) that there are commercially available elevating tables and other products for routinely adjusting heights of an individual's desk or workstation between a proper seated height configuration and an equally proper standing height configuration, it would be advantageous to implement a scheme that would, in a consistent manner, remind and/or force an individual user to routinely readjust the height of the user's desk or workstation in a manner that would promote some amount of standing while at work, without routinely interrupting the user's productivity.

Exemplary embodiments of the systems and methods according to this disclosure may address the above issues by providing a worktable and/or workstation elevation system that includes a number of novel capabilities encompassed in varied automated schemes.

Exemplary embodiments may detect a current elevation state of a worktable and/or workstation elevator apparatus including a current position of the worktable and/or workstation among a plurality of selectable elevation positions and an elapsed time that the worktable and/or workstation has been at the current position with an objective of providing pre-programmed, or otherwise user-scheduled, routine or random automated reminders to the user at the worktable and/or workstation to change the current position of the worktable and/or workstation from one elevation state to the other. In embodiments, the automated reminders may be provided to the user in a form of one or more programmable audio or "pop-up" visual cues presented by the workstation as reminders of when to start standing or sitting.

Exemplary embodiments may enable automatic control, via the user workstation, of one or more worktable and/or workstation elevator actuators making it easier, or otherwise generally unavoidable, for the user to initiate repositioning from a sitting position to a standing position, and vice versa.

Exemplary embodiments may establish a pre-determined and/or pre-scheduled scheme for movement of an automated adjustment to a worktable and/or workstation elevation position between a position supporting a sitting configuration for the user and a position supporting a standing configuration for the user that is protected from modification by an individual user at the worktable and/or workstation.

Exemplary embodiments may track an amount of time, cumulatively or per occurrence, that a user spends sitting and standing over the course of an entire operating and/or monitored period based on user input via the user workstation, or based on sensed inputs from switches and/or sensors mounted to the user worktable and/or workstation or on associated worktable and/or workstation elevator actuators and/or components.

Exemplary embodiments may display statistics that provide feedback to a user, or to others charged with, or interested in, health benefit tracking for one or more users, as to an amount and/or percentage of time that a particular user, or group of users, has spent standing over a selected interval relative to, for example, some pre-set, pre-established or pre-defined goals.

Exemplary embodiments may provide automated implementations and/or control electronics as part of a stand-alone solution offered to the public.

Exemplary embodiments may provide automated implementations and/or control electronics as part of an overall worktable and/or workstation elevator position control solution offered in conjunction with, or licensed to, individuals or companies.

Exemplary embodiments may implement other health reminders that may include, for example, guidance to remind users to get up and walk around or to stretch at specified intervals without modifying a position of the user's worktable and/or workstation.

Exemplary embodiments may be provided as one or more software applications that could be programmed into mobile devices such as, for example, smartphones, iPhones® and the like.

Exemplary embodiments may refer to internal accelerometers in the actuated worktable and/or workstation devices, instead of switches, that could be used to detect when vertical motion is initiated between, for example, a sitting and standing position. In embodiments, images from cameras may be referenced as well.

Exemplary embodiments may implement (1) automatic detection regarding, for example, when an individual worker's workstation is inactive, and (2) automatic suspension of the counting and/or recording of standing time and/or sitting time during periods of detected workstation inactivity. In embodiments, the automatic detection and suspension scheme may reference, for example, when the individual user's workstation enters a screen saver mode, subtracting an elapsed time value according to a current system "idle time before screen saver initiates setting" from the currently active workstation elevation timer. This will ensure that the system accurately tracks the time that the user is working at a workstation in either a standing or sitting position.

Exemplary embodiments may automatically adjust the standing time reminder interval to help a user "catch up" over a specified period of time if the user falls behind relative to the user's target "percent time standing" goal.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing an automated workstation elevation position tracking and control scheme, will be described, in detail, with reference to the following drawings, in which.

DETAILED DESCRIPTION OF THE DISCLOSED EMBODIMENTS

The systems and methods for implementing an automated workstation elevation position tracking and control scheme according to this disclosure will generally refer to this specific utility for those systems and methods. Exemplary embodiments described and depicted in this disclosure should not be interpreted as being specifically limited to any particular configuration of an automated worktable and/or workstation elevation device or system, or to any particular control system or scheme for such a device or system. Any advantageous use of a health monitoring and device adjusting scheme employing devices, systems, techniques, methods and/or schemes such as those discussed in detail in this disclosure are contemplated. The disclosed schemes may be applicable, for example, to programming automated adjustments to active sitting products, wheelchairs and/or variable geometry hospital beds, among others.

Specific reference to, for example, any particular electronic device, including but not limited to, a workstation, a personal computer (PC), a tablet computer, a notebook/laptop computer, a desktop computer, and/or a portable communication device (including a smartphone, a personal digital assistant (PDA), and iPhone®, or an iPad®), which may be programmed with an application for implementing an automated workstation elevation position tracking and control scheme according to this disclosure, should be understood as being exemplary only, and not limiting, in any manner, to any particular class of electronic devices. The systems and methods according to this disclosure will be described as being particularly adaptable to hosting on an individual worker's workstation for controlling varying elevation of that workstation according to the disclosed schemes. These references are meant to be illustrative only in providing a single real-world utility for the disclosed systems and methods, and should not be considered as limiting the disclosed systems and methods to only this scenario. Any commonly known processor-controlled device in which the processor directs reminder signaling or provides output signaling to one or more positional actuators or the like that may be adapted according to the specific capabilities discussed in this disclosure is contemplated.

This disclosure is directed to systems and methods by which active signaling to a user to modify a body position between a sitting and a standing position and/or active elevation position tracking and control to a positional elevation control system or actuator for a worktable and/or workstation may be provided. An objective of the automated workstation elevation position tracking and control scheme according to this disclosure is to improve, in a controlled and planned manner, an ergonomic functionality of one or more worktable and/or workstation units in an office or other working environment. An intent is to modify sedentary work processes normally occupied and/or attended to in a sitting position for extended lengths of time in front of a workstation, which may be of a common variety including a computer display screen, keyboard and mouse. Sensors and control and feedback electronics may be added to known worktable and/or workstation elevation control devices and actuators to provide a mechanism by which to implement the automated workstation elevation position tracking and control scheme. The proposed scheme may keep track of whether the workstation operating components are being used in the sitting position or the standing position, and for how long. The proposed scheme may suggest, direct or implement action that will cause a user to stand while working at the workstation, or to sit while working at the workstation, according to a pre-planned schedule. The proposed scheme may also provide for allowing user selection of options for other ergonomically specific outputs including personal health goal tracking, tracking of percentages of time spent standing for an individual or group of individuals, and other like beneficial feedback. The proposed schemes may provide for user or supervisory personnel input for automated motorized elevation adjustment in a worktable and/or workstation, which may be controlled locally by the workstation, or may be controlled remotely using the workstation only as an implementing conduit to the worktable and/or workstation elevation actuators or devices associated with the workstation, thereby bypassing manual operation to allow full ergonomically controllable programming fitting the personal needs of a specific individual or the desires/requirements of the supervisory personnel. A plurality of individual and programmed workstations may be connected to and controlled by a central server, or otherwise by cloud based application elements.

Figure 1:
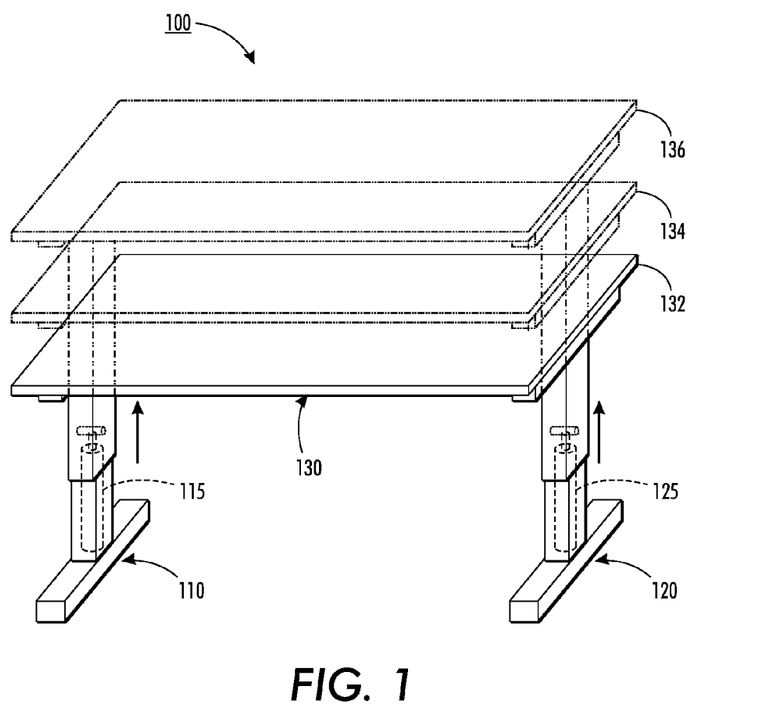
FIG. 1 illustrates a perspective view of an exemplary embodiment of an automatically height adjustable worktable usable with the systems and methods according to this disclosure.

FIG. 1 illustrates a perspective view of an exemplary embodiment 100 of an automatically height adjustable worktable usable with the systems and methods according to this disclosure. As shown in FIG. 1, the automatically height adjustable worktable may be generally configured of a tabletop 130 mounted on legs 110 and 120. Actuators 115,125 respectively mounted in, mounted on, or associated with the legs 110,120 may be usable to adjust a height of the tabletop 130 between a plurality positions including: a lower position 132, which may correspond to a sitting position of a user seated at the worktable; one or more intermediate positions 134, which may be adjustable to varying heights to accommodate seated heights of different chairs or stools occupied by the user in a sitting position, or to accommodate differing preferences of a user while standing at the worktable; and an upper position 136, which may correspond to a full standing position of a user standing at the worktable. One or more sensors or switches may be mounted in, mounted on, or associated with the actuators 115,125. The sensors may include any conventional mechanisms for sensing positional changes including contact and non-contact devices, transducers, potentiometers, accelerometers, visual devices (including cameras) and the like. Many variations in the general arrangement of the component elements of the exemplary embodiment 100 of the automatically height adjustable worktable shown in FIG. 1 may be used.

Figure 2A:
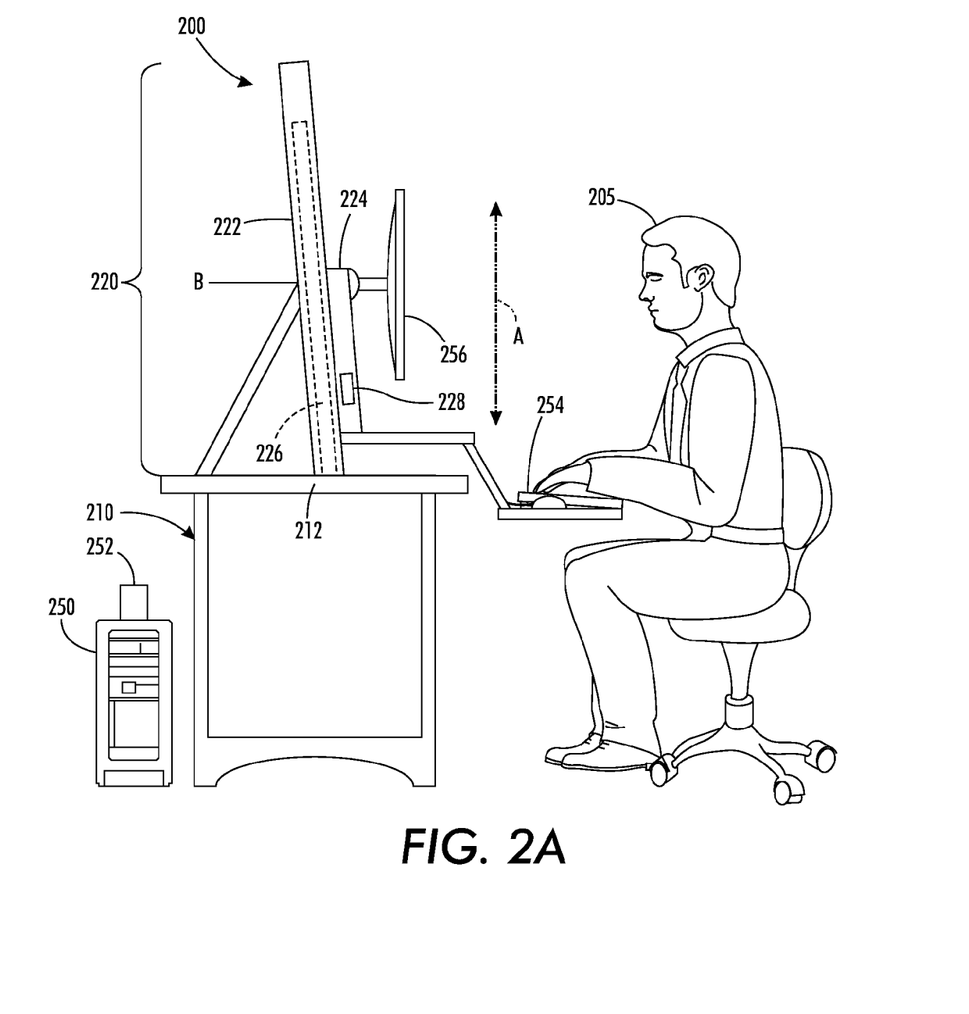
FIGS. 2A and 2B illustrate respective side views of an exemplary embodiment of an automatic tabletop workstation height adjusting unit in a lower/sitting position "B" and an upper/standing position "C" that is usable with the systems and methods according to this disclosure.
Figure 2B:
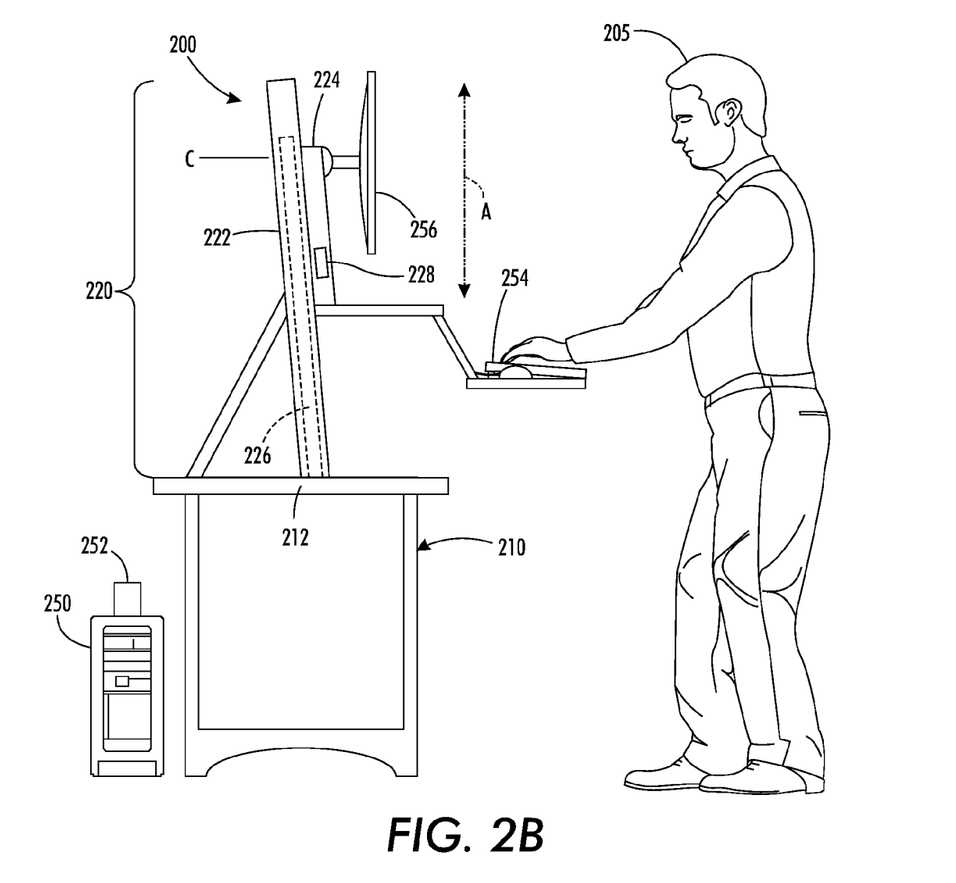

FIGS. 2A and 2B illustrate respective side views of an exemplary embodiment 200 of an automatic tabletop workstation height adjusting unit 220 in a lower/sitting position "B" and an upper/standing position "C" that may be usable with the systems and methods according to this disclosure. As shown in FIGS. 2A and 2B, the automatic tabletop workstation height adjusting unit 220 may be positioned on a table of virtually any configuration, which may generally include a tabletop 212 and a base 210. The automatic tabletop workstation height adjusting unit 220 may include: a base or stationary portion 222, which may be, for example, affixed to the tabletop; and a movable portion 224 on which a user workstation including at least a keyboard 254 and a display screen 256 may be positioned. Actuators 226 may be used to adjust a positioning (height) of the movable portion 224 in directions "A" between, for example, a lower position B (see FIG. 2A), which may correspond to a sitting position of a user 205 seated at the table while using the workstation, and an upper position C (see FIG. 2B), which may correspond to a standing position of the user 205 standing at the table while using the workstation. The actuators 226 may be in a form of springs, counterweights or the like to aid in a manual movement of the movable portion 224 between the lower position "B" and the upper position "C." In embodiments, the actuators 226 may be powered, i.e., hydraulically, pneumatically or electrically powered actuating components in communication with an automated signaling unit to provide powered movement according to an actuating signal between the lower position "B" and the upper position "C." One or more sensors or switches 228 may be mounted in, mounted on, or associated with the actuators 226, and/or the movable portion 224. The one or more sensors or switches 228 may communicate with an interface module 252 that may be associated with a local personal computer tower 250 that is associated with the other workstation components 254,256. The communications may be via wired or wireless means. As with the embodiment shown in FIG. 1, the sensors may include any conventional mechanisms for sensing positional changes including contact and non-contact devices, transducers, potentiometers, accelerometers, visual devices (including cameras) and the like. Many variations in the general arrangement of the component elements of the automatic tabletop workstation height adjusting unit 220 shown in FIGS. 2A and 2B may be used. Also, in embodiments, the movable portion 224 may serve as a platform on which a laptop computer or other like device may be placed.

Figure 2C:
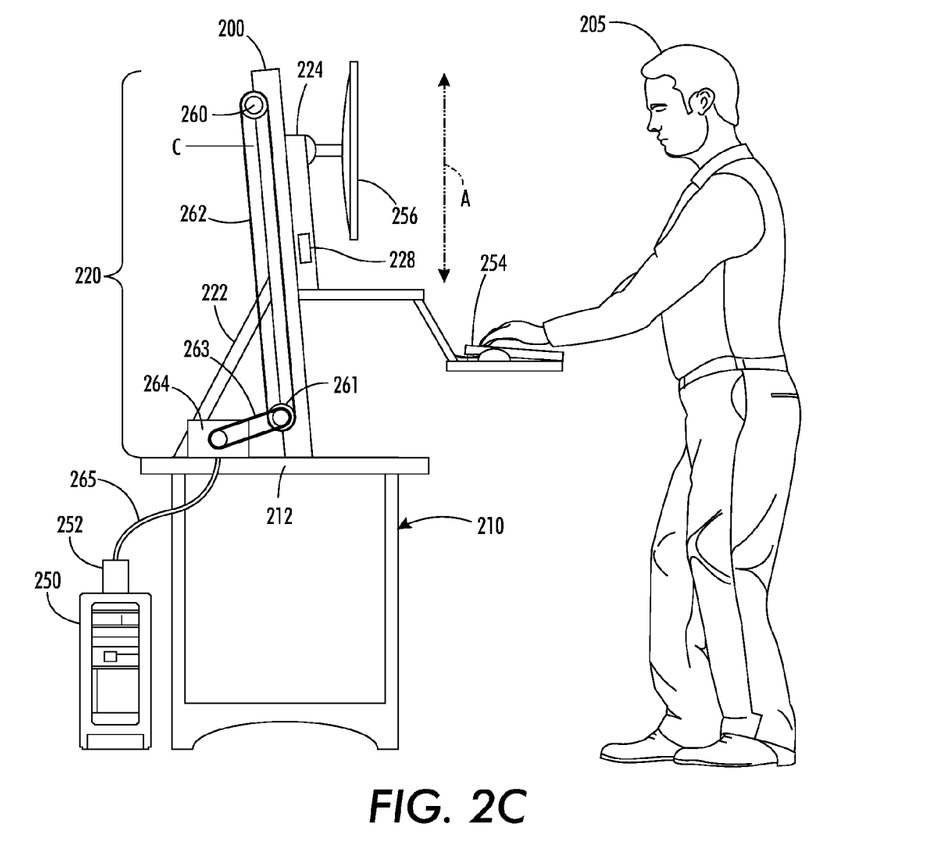
FIG. 2C modifies FIG. 2B to illustrate an exemplary embodiment of a powered unit by which the exemplary embodiment of the automatic tabletop workstation height adjusting unit shown in FIGS. 2A and 2B may be moved between the lower/sitting position "B" and the upper/standing position "C" according to this disclosure.

FIG. 2C modifies FIG. 2B to illustrate an exemplary embodiment of a powered unit by which the automatic tabletop workstation height adjusting unit shown in FIGS. 2A and 2B may be moved between the lower/sitting position "B" and the upper/standing position "C." The exemplary powered unit may include an upper pulley 260 and a lower pulley 261 with an actuating belt 262 between the upper pulley 260 and the lower pulley 261. The upper pulley 260, lower pulley 261 and actuating belt 262 may be enclosed by protective covers which are removed in the depiction in FIG. 2C for clarity. The movable portion 224 may be attached to the actuating belt 262 to facilitate movement of the movable portion 224 between the lower/sitting position "B" and the upper/standing position "C." A motor 264 may provide power to, for example, move the lower pulley 261, by action of a motor belt 263 provided between the motor 264 and the lower pulley 261. Power and/or data signals may be exchanged between the interface module 252 associated with the local personal computer tower 250 via a wired power/data/control bus 265. Information exchanged over the wired power/data/control bus 265 may include an indication of the position of the movable portion 224 transmitted from one or more sensors, including the depicted one or more sensors or switches 228 shown in FIG. 2C.

Figure 3:
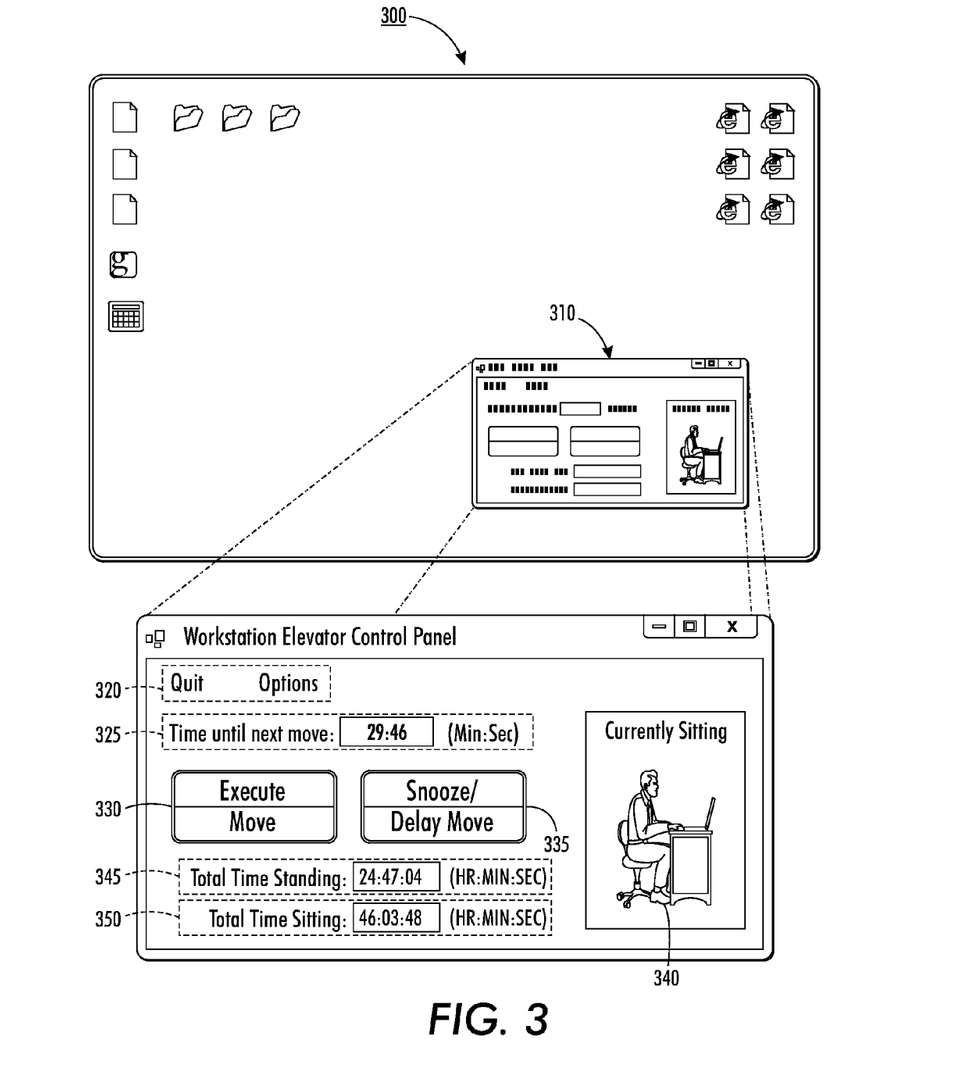
FIG. 3 illustrates a display device displaying an exemplary embodiment of an automated workstation elevator control panel via which a user may interact with an automated workstation elevation position tracking and control scheme according to this disclosure.

FIG. 3 illustrates a display device 300 displaying an exemplary embodiment of an automated workstation elevator control panel 310 via which a user may interact with an automated workstation elevation position tracking and control scheme according to this disclosure.

The exemplary automated workstation elevator control panel 310 may include a first (function) field 320 including "buttons" by which a user may manipulate functioning of the automated workstation elevation position tracking and control scheme. In the depicted example, the user may select a "Quit" button to exit the automated workstation elevation position tracking and control scheme. Otherwise, the user may select an "Options" button to be taken to one or more lower or embedded levels of option selection displays associated with the automated workstation elevation position tracking and control scheme, as will be described in exemplary manner with reference to the depiction in FIG. 4 discussed below. It should be recognized that the first (function) field 320 on the exemplary automated workstation elevator control panel 310 shown in FIG. 3 may include a wide variety of buttons, beyond those depicted, by which the user may further, and in an increasingly detailed manner, manipulate the functioning of the automated workstation elevation position tracking and control scheme.

The exemplary automated workstation elevator control panel 310 may include a second (timer) field 325 by which a user may, for example, track an in-process timing associated with the automated workstation elevation position tracking and control scheme. In the depicted example, the user may be informed of an elapsed "Time until next move" from a sitting to a standing configuration in the example, or otherwise from a standing to a sitting configuration. It should be recognized that the second (timer) field 325 on the exemplary automated workstation elevator control panel 310 shown in FIG. 3 may be otherwise configured in any manner that may provide like information to the user regarding the timing associated with the automated workstation elevation position tracking and control scheme. For example, the second (timer) field 325 may display a local clock time for the next move that the user may compare with a local time display otherwise presented on the display device 300.

The exemplary automated workstation elevator control panel 310 may include a first individual button 330 including some identifying nomenclature, e.g., "Execute Move" as depicted, by which a user may manipulate functioning of the automated workstation elevation position tracking and control scheme. The first individual button 330 may become active according to a pre-set schedule to allow the user to take one or more actions at, for example, a time when a countdown timer in a second (timer) field 325 reaches zero. Once the first individual button 330 becomes active in this manner or otherwise, the user may actuate the first individual button 330 to confirm that the user is manually adjusting, or has manually adjusted, the workstation elevation from one setting to another: from a sitting to a standing configuration or from a standing to a sitting configuration and is likewise moving in accordance with the new configuration. In embodiments, the first individual button 330 may simply illuminate to advise the user that the automated workstation elevation position tracking and control scheme is sending a signal to actuators to move the workstation elevation from one setting to another. In this regard, no user input may be required or possible. Otherwise, illumination/activation of the first individual button 330 may advise the user that the automated workstation elevation position tracking and control scheme is ready to send a signal to actuators to move the workstation elevation from one setting to another, but user confirmation may be required by actuation of the first individual button 330. This option in the functioning of the automated workstation elevation position tracking and control scheme may provide a level of safety in order to afford the user the ability to confirm that there are no obstructions or other issues that would pose a hazard based on a commanded, yet unconfirmed, movement signal being sent to the actuators. It should be recognized that the above discussion touches on only a few of the functional options in the automated workstation elevation position tracking and control scheme that may be controlled or implemented by the first individual button 330.

The exemplary automated workstation elevator control panel 310 may include a second individual button 335 including some identifying nomenclature, e.g., "Snooze/Delay Move" as depicted, by which a user may manipulate functioning of the automated workstation elevation position tracking and control scheme by, for example, delaying an action according to the pre-planned schedule for a specified, or indefinite amount of time. The second individual button 335 may become active, at the same time, and/or in the same manner as the first individual button 330, according to a pre-set schedule to allow the user to delay taking one or more actions at, for example, the time when the countdown timer in a second (timer) field 325 reaches zero. Once the second individual button 335 becomes active in this manner or otherwise, the user may actuate the second individual button 335 to set an interim timer to a specified time by which the user desires to postpone adjustment of the workstation elevation from one setting to another. In embodiments, the second individual button 335 may act in concert with the simply illuminated first individual button to provide the user a capability to stop the automated workstation elevation position tracking and control scheme from sending a signal to the actuators to move the workstation elevation from one setting to another for a specified or non-specified period of time, thereby modifying the preplanned schedule. In this regard, user input may be required to stop automated movement direct by the automated workstation elevation position tracking and control scheme. As above, this option in the functioning of the automated workstation elevation position tracking and control scheme may provide a level of safety in order to afford the user the ability to inhibit a commanded movement signal being sent to the actuators. It should be recognized that the above discussion touches on only a few of the functional options in the automated workstation elevation position tracking and control scheme that may be controlled or implemented by the second individual button 335.

The exemplary automated workstation elevator control panel 310 may include a status display section 340 in which a pictorial display of a current position or mode of the workstation elevation may be depicted in a manner that may be easily interpreted by a user. It should be recognized that a wide variety of pictorial representations may be provided in the status display section 340 of the exemplary automated workstation elevator control panel 310 shown in FIG. 3 to aid a user in tracking a current status, for example, of the functioning of the automated workstation elevation position tracking and control scheme in a simple, easy-to-understand manner.

The exemplary automated workstation elevator control panel 310 may include third and fourth (cumulative time or other statistics) display fields 345, 350 by which a user may for example monitor a cumulative time spent standing or a cumulative time spent sitting (as shown), or other like statistical information of differing configurations and content to assess, for example, benefits to a user or compliance by a user in following the functioning of the automated workstation elevation position tracking and control scheme.

Figure 4:
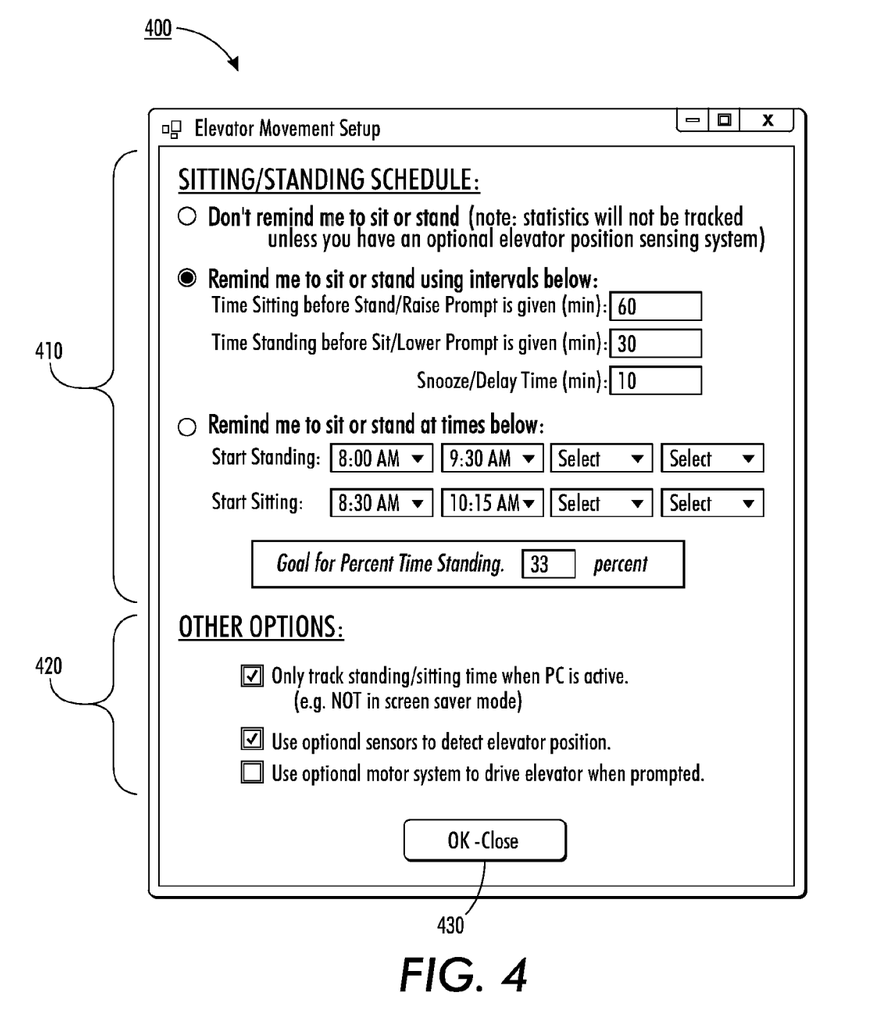
FIG. 4 illustrates an exemplary embodiment of a workstation elevator software system setup (menu) display via which a user may indicate certain parameters for an automated workstation elevation position tracking and optional motor control scheme according to this disclosure.

FIG. 4 illustrates an exemplary embodiment of a workstation elevator software system setup (menu) display 400 via which a user may indicate certain parameters for an automated workstation elevation position tracking and optional motor control scheme according to this disclosure. As shown in FIG. 4, the user may be afforded myriad options by which to schedule reminders or automated movements of the workstation elevation movement as shown in the exemplary "SITTING/STANDING SCHEDULE" section 410 of the automated elevator movement setup (menu) display 400. Additionally, the user may be afforded additional options by which to direct other functioning of the automated workstation elevation position tracking and control scheme as shown in the exemplary "OTHER OPTIONS" section 420 of the automated elevator movement setup (menu) display 400. Finally, the user may be afforded an opportunity to confirm the user's selection of particular options and return to higher order displays by actuating an "OK—Close" button 430. It should be recognized that the depicted automated elevator movement setup (menu) display 400 shown in FIG. 4 may include a wide variety of selectable options well beyond those particularly shown in exemplary manner in FIG. 4.

Figure 5:
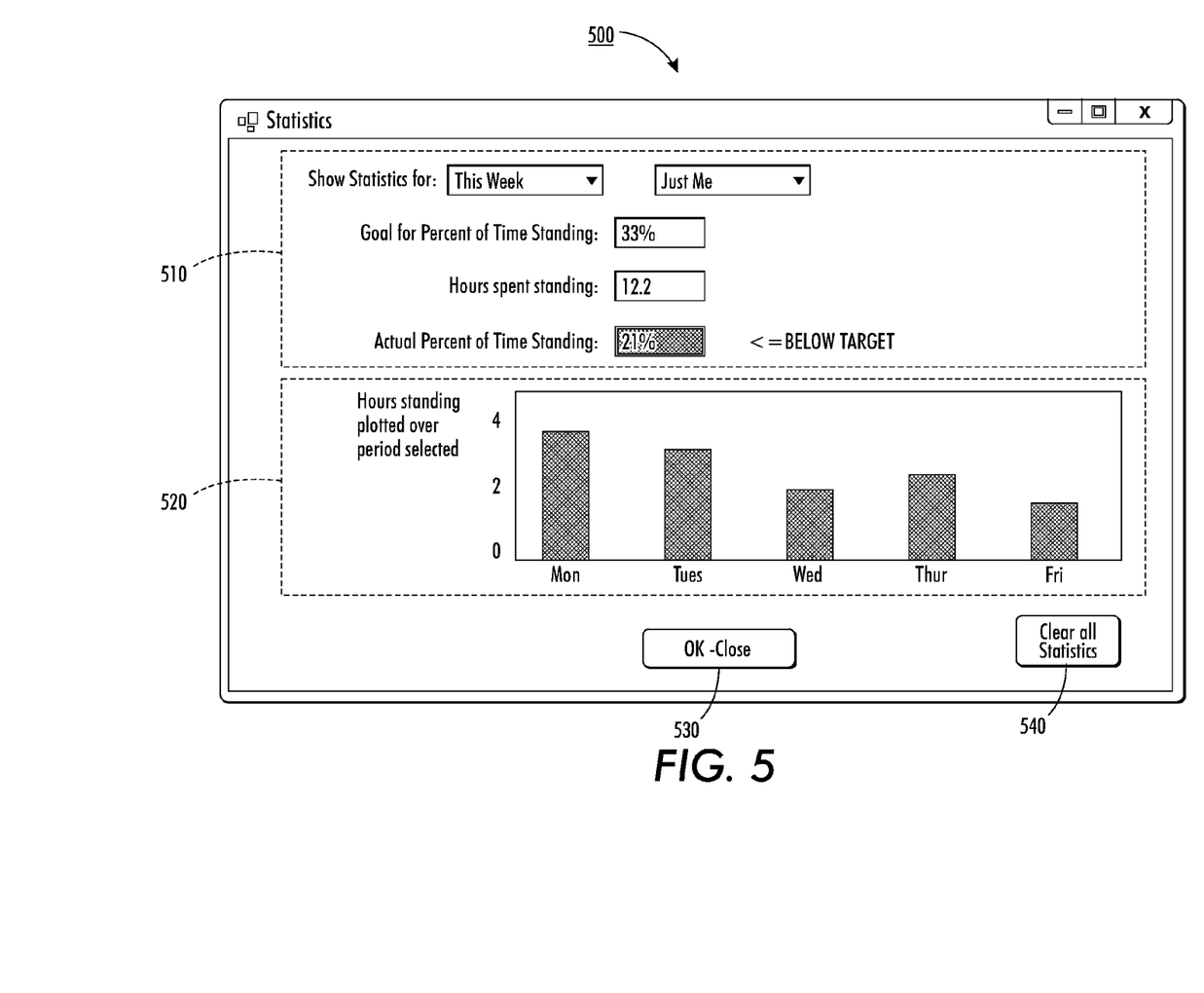
FIG. 5 illustrates an exemplary embodiment of a statistics display for providing feedback regarding actual results of an automated workstation elevation position tracking and control scheme according to this disclosure.

FIG. 5 illustrates an exemplary embodiment of a statistics display 500 for providing feedback regarding actual results of an automated workstation elevation position tracking and control scheme according to this disclosure. As shown in FIG. 5, a number of numeric statistics and user input options may be displayed in a first section 510 of the exemplary statistics display 500. A corresponding graphical representation may be displayed in a second section 520 of the exemplary statistics display 500. The user may be afforded an opportunity to confirm the user's selection of particular options and or to exit the exemplary statistics display 500 and return to higher order displays by actuating an "OK—Close" button 530. The user may be afforded an opportunity to erase all of the statistics and/or statistics settings by actuating a "Clear all Statistics" button 540. It should be recognized that the depicted exemplary statistics display 500 shown in FIG. 5 may include a wide variety of statistical representations well beyond those shown in exemplary manner in FIG. 5.

Figure 6:
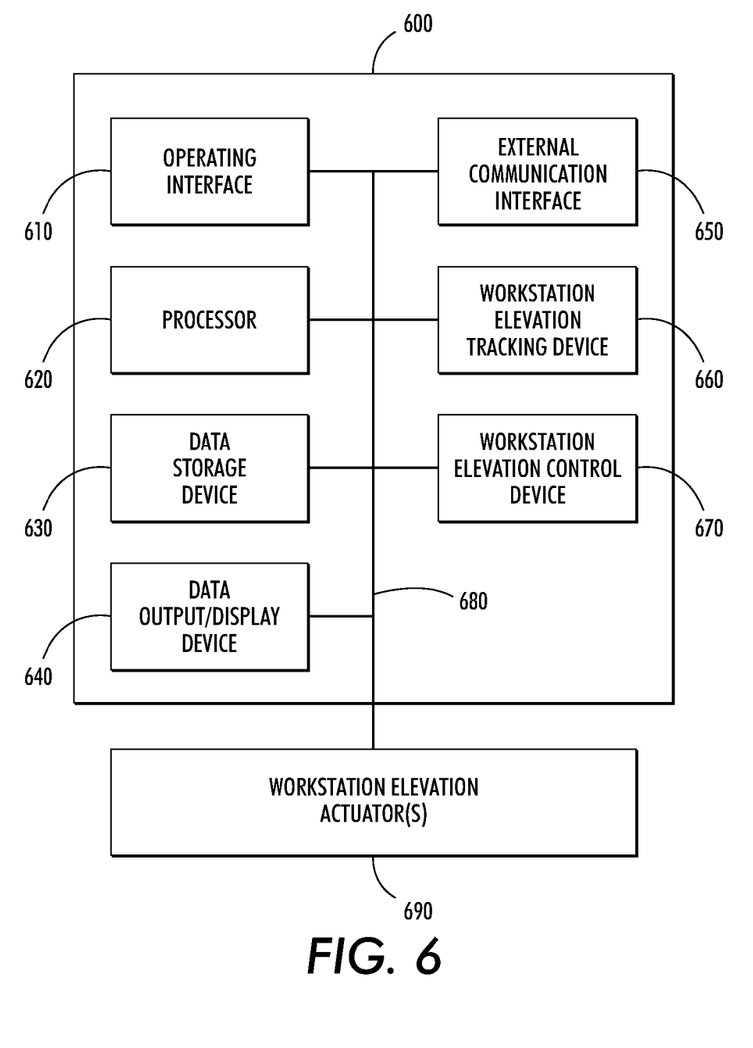
FIG. 6 illustrates a block diagram of an exemplary control system for implementing an automated workstation elevation position tracking and control scheme according to this disclosure.

FIG. 6 illustrates a block diagram of an exemplary control system 600 for implementing an automated workstation elevation position tracking and control scheme according to this disclosure.

The exemplary control system 600 may include an operating interface 610 by which a user may communicate with the exemplary control system 600. The operating interface 610 may be associated with a user's workstation, an elevation of which may be modified according to the disclosed automated workstation elevation position tracking and control scheme. The operating interface 610 may be configured as one or more conventional mechanisms common to user workstations and/or computing devices that may permit a user to input information to the exemplary control system 600. The operating interface 610 may include, for example, a conventional keyboard and mouse, a touchscreen with "soft" buttons or with various components for use with a compatible stylus, a microphone by which a user may provide oral commands to the exemplary control system 600 to be "translated" by a voice recognition program, or other like device by which a user may communicate specific operating instructions or scheduling parameters, for example, to the exemplary control system 600.

The exemplary control system 600 may include one or more local processors 620 for individually operating the exemplary control system 600 and for carrying out the operating functions of the automated workstation elevation position tracking and control scheme according to this disclosure. Processor(s) 620 may include at least one conventional processor or microprocessor that interprets and executes instructions to direct general functioning of the exemplary control system 600 in carrying out the automated workstation elevation position tracking and control scheme.

The exemplary control system 600 may include one or more data storage devices 630. Such data storage device(s) 630 may be used to store data or operating programs to be used by the exemplary control system 600, and specifically the processor(s) 620 in implementing the disclosed automated workstation elevation position tracking and control scheme. Data storage device(s) 630 may be used to store information input by one or more users related to scheduling of reminders or directed elevation movements, and/or other user-selectable options for control and reporting that may be available as the automated workstation elevation position tracking and control scheme is implemented by the exemplary control system 600, and/or the processor(s) 620. The data storage device(s) 630 may also be used to store accumulated statistics collected during execution of the automated workstation elevation position tracking and control scheme in a manner that may be selectably accessible by a user or other individual. The data storage device(s) 630 may include a random access memory (RAM) or another type of dynamic storage device that is capable of storing updatable database information, and for separately storing instructions for execution of system operations by, for example, processor(s) 620. Data storage device(s) 630 may also include a read-only memory (ROM), which may include a conventional ROM device or another type of static storage device that stores static information and instructions for processor(s) 620. Further, the data storage device(s) 630 may be integral to a workstation housing or hosting the exemplary control system 600, or may be provided external to, and in wired or wireless communication with, the workstation and/or the exemplary control system 600.

The exemplary control system 600 may include at least one data output/display device 640, which may be configured as one or more conventional mechanisms that output information to a user, including a display screen (see FIG. 3) on workstation that may display to a user separate individual displays related to the implementation and functioning of the automated workstation elevation position tracking and control scheme as shown, for example, in FIGS. 3-6 described in detail above.

The exemplary control system 600 may include one or more separate external communication interfaces 650 by which the exemplary control system 600 may communicate with components external to the exemplary control system 600. At least one of the external communication interfaces 650 may be configured as an output port providing wired or wireless communication to one or more workstation elevation actuator(s) 690, to provide a signal to the one or more workstation elevation actuators(s) 690 to change an elevation of a workstation according to the disclosed automated workstation elevation position tracking and control scheme. At least one other of the external communication interfaces 650 may be configured as an output port providing wired or wireless communication to an external data repository or external data storage device to which statistical information collected by the disclosed automated workstation elevation position tracking and control scheme may be transferred for storage. Any suitable data connection in wired or wireless communication with switching, sensors and/or power sources for the workstation elevation actuator(s) 690, or an external data repository or external data storage device, is contemplated to be encompassed by the depicted external communication interface 650.

The exemplary control system 600 may include a workstation elevation tracking device 660, as a part of a processor 620 coupled to, for example, one or more data storage devices 630, or as a separate stand-alone component, module or circuit in the exemplary control system 600, by which the exemplary control system 600 may reference user inputs via the operating interface 610, or automated sensor inputs received via one or more external communication interface(s) 650 to detect a current elevation state of a workstation elevator apparatus including a current position of the workstation among a plurality of selectable elevation positions and an elapsed time that the workstation has been at the current position in support of the disclosed automated workstation elevation position tracking and control scheme. The term "sensor inputs," as used above and referenced throughout this disclosure, is intended to broadly encompass signal inputs that may be received from one or more sensors or switches mounted in, mounted on, or associated with moving and movable components. The sensors may include any conventional mechanisms for sensing positional changes including contact and non-contact devices, transducers, potentiometers, accelerometers, linear and rotational positional change detecting devices, visual devices (including cameras) and the like.

The exemplary control system 600 may include a workstation elevation control device 670, as a part of a processor 620 coupled to, for example, one or more data storage devices 630, or as a separate stand-alone component, module or circuit in the exemplary control system 600, by which the exemplary control system 600 may formulate and send signals to the workstation elevation actuator(s) 690 via one or more of the external communication interface(s) 650 to enable automatic control of the workstation elevation actuator(s) 690 to initiate repositioning of a workstation from a sitting position to a standing position, and/or from a standing position to a sitting position.

All of the various components of the exemplary control system 600, as depicted in FIG. 6, may be connected internally, and to one or more of the workstation elevation actuator(s) 690, by one or more data/control busses 680. These data/control busses 680 may provide wired or wireless communication between the various components of the exemplary control system 600, whether all of those components are housed integrally in a user workstation, or are otherwise external and connected to a user workstation.

It should be appreciated that, although depicted in FIG. 6 as an integral unit, the various disclosed elements of the exemplary control system 600 may be arranged in any combination of sub-systems as individual components or combinations of components, integral to a single unit, or external to, and in wired or wireless communication with the single unit of the exemplary control system 600. Separately, individual components of the exemplary control system 600 may be housed in or hosted on one or more other electronic devices, including a tablet computer, a notebook/laptop computer, a smartphone, a PDA, an iPhone®, an iPad® or other like device, including such devices that may be in wireless communication with a user workstation or a device for changing an elevation of the workstation. In other words, no specific configuration as an integral unit or as a support unit is to be implied by the depiction in FIG. 6. Further, although depicted as individual units for ease of understanding of the details provided in this disclosure regarding the exemplary control system 600, it should be understood that the described functions of any of the individually-depicted components may be undertaken, for example, by one or more processors 620 connected to, and in communication with, one or more data storage device(s) 630.

Figure 7:
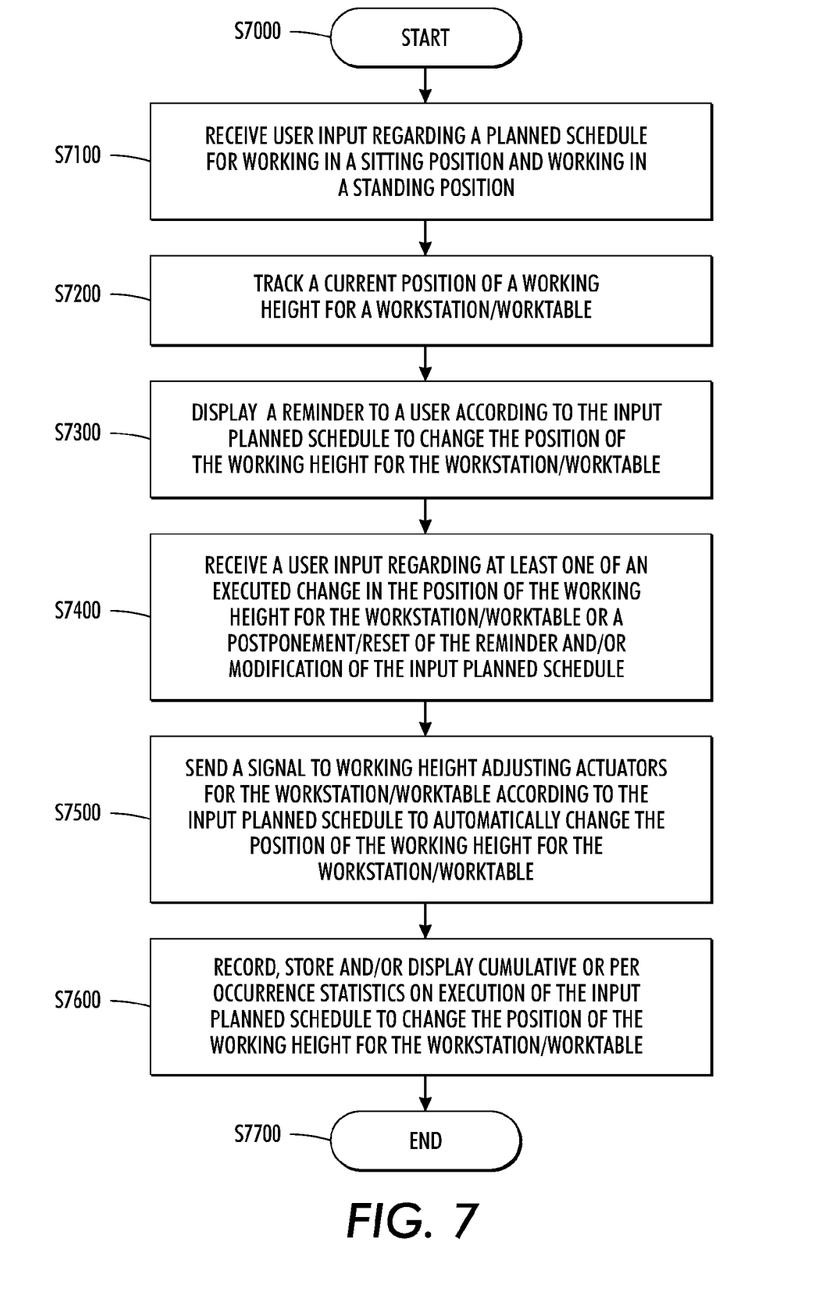
FIG. 7 illustrates a flowchart of an exemplary method for effecting an automated workstation elevation position tracking and control scheme according to this disclosure.

The disclosed embodiments may include a method for effecting an automated workstation elevation position tracking and control scheme. FIG. 7 illustrates a flowchart of such an exemplary method. As shown in FIG. 7, operation of the method commences at Step S7000 and proceeds to Step S7100.

In Step S7100, an input may be received regarding a planned schedule for working in a sitting position and working in a standing position at a workstation. The input may be received, for example, from a user at a user workstation, or otherwise may be received from a system administrator in control of, in communication with, or in an oversight role with regard to a plurality of user workstations connected to a central server or to the cloud. Operation of the method proceeds to Step S7200.

In Step S7200, a current position of a working height for a worktable and/or a workstation may be tracked. This tracking may be based on a real-time user input via, for example, a user interface associated with the workstation, or otherwise may be based on sensor information provided by sensors mounted in, mounted on, or otherwise associated with, a height adjustable apparatus, system, device, or actuator associated with the worktable and/or workstation. Information on the current position of the working height may be supplemented with tracked information regarding an elapsed time that the working height of the worktable and/or workstation has been at its current position. Operation of the method proceeds to Step S7300.

In Step S7300, a reminder may be displayed to a user according to the previously-input planned schedule directing the user to change a position of the working height for the worktable and/or workstation from a current sitting height configuration to a standing height configuration or from a current standing height configuration to a sitting height configuration. The reminder may be displayed, for example, on the workstation or otherwise on a portable communication device as discussed above. Operation of the method proceeds to Step S7400.

In Step S7400, a user input may be received via, for example, an operating interface, regarding at least one of (1) an executed change in the position of the working height of the worktable and/or workstation according to the reminder, or (2) a postponement, reset or modification of the planned schedule according to a user's desires or permissions in executing the automated workstation elevation position tracking and control scheme. Operation of the method proceeds to Step S7500

In Step S7500, a signal may be also, or separately, sent to one or more working height adjusting actuators for modifying a working height for the worktable and/or workstation according to the input planned schedule to automatically change the working height of the worktable and/or workstation. As indicated above, certain safety interlocks may be provided in the implementation of the automated workstation elevation position tracking and control scheme that may require some user input to confirm authority of the one or more working height adjusting actuators to modify the working height for the worktable and/or workstation. Operation of the method proceeds to Step S7600.

In Step S7600, cumulative, or per occurrence, statistics related to execution of the disclosed automated workstation elevation position tracking and control scheme may be recorded, stored and/or displayed according to known methods, and as detailed above, to provide feedback to a user or others on compliance with, and health benefits achieved by, the automated workstation elevation position tracking and control scheme with regard to an individual user or a group of users. Operation of the method proceeds to Step S7700, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional and/or known physical and electronic control components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced with regard to elevating and otherwise movable structures of many different configurations. Embodiments according to this disclosure may be practiced in office and other working environments where tasks are generally performed by users seated at worktables or workstations for prolonged periods. Local and remote computing devices may, for example, remotely implement the automated workstation elevation position tracking and control scheme in one or more workstations according to the disclosed embodiments. Remotely-located devices and components may be linked to each other by hardwired links, wireless links, or a combination of both through a communication network. In a distributed computing environment, program modules may be located in both local and remote memory storage devices.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions (or method steps), or associated data structures, represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 7, except where execution of a particular method step is a necessary precondition to execution of any other method step. Not all of the steps of the method depicted in FIG. 7 need be executed by any system according to this disclosure to implement embodiments of the disclosed scheme.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A system for adjusting a height of a workstation, comprising:
a movable mounting system for a workstation, the movable mounting system being adjustable in elevation between at least one lower position and at least one upper position;
a tracking device that tracks a current position of the movable mounting system at one of the at least one upper position and the at least one lower position and that records an elapsed time that the movable mounting system is at the current position; and
a reminder device executed by a processor that provides a user with at least one of an audible or visual notification to change the current position of the movable mounting system to another position.

2. The system of claim 1, further comprising an operating interface by which a user may communicate with the system, the tracking device tracking the current position of the movable mounting system by receiving a user input via the operating interface.

3. The system of claim 1, further comprising:
an elevation adjusting device connected to the movable mounting system that adjusts the elevation of the movable mounting system between the at least one lower position and the at least one upper position;
one or more switches or sensors associated with the elevation adjusting device; and
a communication interface via which the one or more switches or sensors communicates with the tracking device,
the tracking device tracking the current position of the movable mounting system by receiving signals from the one or more switches or sensors via the communication interface.

4. The system of claim 3, the received signals from the one or more switches or sensors comprising at least one of a signal from an accelerometer and an image from a camera.

5. The system of claim 3, the elevation adjusting device comprising a powered drive actuator, the reminder device generating a signal to cause the powered drive actuator to change the current position of the movable mounting system to the another position.

6. The system of claim 1, the tracking device tracking the elapsed time that the movable mounting system is at each of the at least one upper position and the at least one lower position, and calculating statistical data that compares at least the elapsed time that the movable mounting system is at the at least one upper position to a pre-defined time period, the statistical data being retrievable by the user.

7. The system of claim 6, further comprising a display device that displays the statistical data to the user for at least one of a plurality of pre-defined time periods.

8. The system of claim 6, the tracking device being one of a plurality of tracking devices connected to a network, the statistical data for the plurality of tracking devices being retrievable by the user.

9. The system of claim 6, the tracking device detecting that the workstation is in an idle state, and adjusting the tracking of the elapsed time so that time periods during which the workstation is detected to be in an idle state time are excluded from the statistical data.

10. The system of claim 6, the reminder device providing the user with additional pre-defined messages at specified intervals.

11. The system of claim 6, the tracking device comparing the statistical data regarding the elapsed time that the movable mounting system is at the at least one upper position to a pre-defined goal and displaying on a display device an indication of the comparison.

12. The system of claim 6, the tracking device comparing a calculated ratio of the elapsed time that the movable mounting system is at the at least one upper position as a percentage of a specified total time and displaying on a display device an indication of a comparison of the percentage to a pre-defined goal.

13. The system of claim 12, the tracking device automatically adjusting a required time that the movable mounting system is at the at least one upper position to provide additional reminders to compensate for a detected shortfall of the percentage relative to the pre-defined goal.

14. The system of claim 1, the tracking device determining that the movable mounting system has been at the current position up to a specified time, and the reminder device providing the at least one of the audible or visual notification to the user to change the current position of the movable mounting system to the another position at the specified time.

15. The system of claim 14, the specified time being at least one of an interval of time and a clock time specified by a user.

16. The system of claim 14, the specified time being delayed by the user by a specified delay time based on an input from the when the reminder device provides the at least one of the audible or visual notification to the user.

17. A workstation height adjusting method, comprising:
providing a movable mounting system for a workstation, the movable mounting system being adjustable in elevation between at least one lower position and at least one upper position;
tracking with a tracking device a current position of the movable mounting system at one of the at least one upper position and the at least one lower position;
recording, with a processor, an elapsed time that the movable mounting system is at the current position; and
alerting a user, via a processor-generated reminder, including at least one of an audible or visual notification to change the current position of the movable mounting system to another position.

18. The method of claim 17, further comprising receiving, with the tracking device, an indication of the current position of the movable mounting system by a user input via an operating interface by which the user confirms the current position of the movable mounting system.

19. The method of claim 17, further comprising:
adjusting an elevation of the movable mounting system between the at least one lower position and the at least one upper position using receiving with an elevation adjusting device connected to the movable mounting system; and
receiving, with the tracking device, an indication of the current position of the movable mounting system via one or more switches or sensors associated with the elevation adjusting device and a communication interface via which the one or more switches or sensors communicates with the tracking device.

20. The method of claim 19, the elevation adjusting device comprising a powered drive actuator, the processor generating a signal to cause the powered drive actuator to change the current position of the movable mounting system to the another position.

21. The method of claim 17, further comprising:
- tracking the elapsed time that the movable mounting system is at each of the at least one upper position and the at least one lower position; and
- calculating statistical data that compares at least the elapsed time that the movable mounting system is at the at least one upper position to a pre-defined time period, the statistical data being retrievable by the user.

22. The method of claim 21, further comprising displaying, on a display device, the statistical data to the user for at least one of a plurality of pre-defined time periods.

23. The method of claim 21, further comprising detecting that the workstation is in an idle state, and adjusting the tracking of the elapsed time so that time periods during which the workstation is detected to be in an idle state time are excluded from the statistical data.

24. The method of claim 21, further comprising providing the user with additional pre-defined messages at specified intervals.

25. The method of claim 21, further comprising comparing the statistical data regarding the elapsed time that the movable mounting system is at the at least one upper position to a pre-defined goal and displaying on a display device an indication of the comparison.

26. The method of claim 17, further comprising comparing a calculated ratio of the elapsed time that the movable mounting system is at the at least one upper position as a percentage of a specified total time and displaying on a display device an indication of a comparison of the percentage to a pre-defined goal.

27. The method of claim 26, further comprising automatically adjusting a required time that the movable mounting system is at the at least one upper position to provide additional reminders to compensate for a detected shortfall of the percentage relative to the pre-defined goal.

28. The method of claim 17, further comprising:
- determining that the movable mounting system has been at the current position up to a specified time; and
- alerting the user, via the processor-generated reminder, the at least one of the audible or visual notification to change the current position of the movable mounting system to the another position at the specified time,
- the specified time being at least one of an interval of time and a clock time specified by a user.

29. The method of claim 28, the specified time being delayed by the user by a specified delay time based on an input from the when the reminder device provides the at least one of the audible or visual notification to the user.

30. A non-transitory data storage medium on which is recorded a program which, when executed by a processor, causes the processor to execute the steps of workstation a height adjusting method, comprising:
- tracking, with a tracking device, a current position of a movable mounting system at one of at least one upper position and at least one lower position;
- recording an elapsed time that the movable mounting system is at the current position; and
- alerting a user, via a processor-generated reminder, including at least one of an audible or visual notification, to change the current position of the movable mounting system to another position.

* * * * *